United States Patent
Aekbote et al.

(10) Patent No.: US 10,094,737 B2
(45) Date of Patent: Oct. 9, 2018

(54) AIRBAG TESTING APPARATUS HAVING AN ANTHROPOMORPHIC TEST DEVICE

(71) Applicant: Ford Global Technologies, LLC, Dearborn, MI (US)

(72) Inventors: Krishnakanth E. Aekbote, Novi, MI (US); Harikrishna Devaraj, Northville, MI (US); Melissa Gayle Parks, Novi, MI (US); Steven Kelly, Dearborn Heights, MI (US); Stephen Philip Panoff, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 128 days.

(21) Appl. No.: 15/047,922

(22) Filed: Feb. 19, 2016

(65) Prior Publication Data

US 2017/0241861 A1    Aug. 24, 2017

(51) Int. Cl.
*G01M 7/08* (2006.01)
*B60R 21/232* (2011.01)
*G01M 17/007* (2006.01)

(52) U.S. Cl.
CPC ............. *G01M 7/08* (2013.01); *B60R 21/232* (2013.01); *G01M 17/0078* (2013.01)

(58) Field of Classification Search
None
See application file for complete search history.

(56) References Cited

U.S. PATENT DOCUMENTS

| | | | |
|---|---|---|---|
| 5,483,845 A | 1/1996 | Stein et al. | |
| 5,485,758 A * | 1/1996 | Brown | G01M 17/0078 73/12.04 |
| 5,652,375 A * | 7/1997 | Da Re' | G01M 17/0078 73/12.01 |
| 6,023,984 A | 2/2000 | Mazur et al. | |
| 6,672,177 B2 * | 1/2004 | Hutchenreuther | G01M 17/00 73/865.3 |

(Continued)

FOREIGN PATENT DOCUMENTS

| CN | 201852753 U | 6/2011 |
|---|---|---|
| CN | 202305168 U | 7/2012 |

(Continued)

OTHER PUBLICATIONS

UKIPO Search Report dated Jul. 12, 2017 for GB Patent Application No. GB1702529.7 (4 pages).

(Continued)

*Primary Examiner* — Peter MacChiarolo
*Assistant Examiner* — Jermaine Jenkins
(74) *Attorney, Agent, or Firm* — Frank A. MacKenzie; Bejin Bieneman PLC

(57) ABSTRACT

A test apparatus includes a linear motion generator, an airbag, a plate, a platform, an anthropomorphic test device, and a crushable member. The airbag is spaced from the linear motion generator. The plate is moveable by the linear motion generator toward the airbag, and the platform is fixed relative to the plate. The anthropomorphic test device is adjacent the airbag and includes an end coupled to the platform. The crushable member is disposed between the plate and the platform, and the crushable member is deformable by the plate. During operation of the test apparatus, the linear motion generator moves the plate into the crushable member to slow movement of the anthropomorphic device toward the airbag. The crushable member crushes to simulate the forces on the anthropomorphic test device from a vehicle side impact.

24 Claims, 4 Drawing Sheets

(56) References Cited

U.S. PATENT DOCUMENTS

| | | | |
|---|---|---|---|
| 7,204,165 | B1 | 4/2007 | Plaga et al. |
| 7,216,557 | B2 * | 5/2007 | David ............... B60R 21/01554 |
| | | | 73/865.3 |
| 7,543,475 | B2 * | 6/2009 | Rieser ............... G01M 17/0078 |
| | | | 73/12.04 |
| 7,610,821 | B2 * | 11/2009 | Klein ................ G01M 17/0078 |
| | | | 73/865.3 |
| 7,770,917 | B2 | 8/2010 | Henderson et al. |
| 9,046,441 | B2 * | 6/2015 | Kobayashi ........ G01M 17/0078 |
| 2008/0016970 | A1 | 1/2008 | Klein |
| 2017/0241861 | A1 | 8/2017 | Aekbote et al. |

FOREIGN PATENT DOCUMENTS

| | | | |
|---|---|---|---|
| CN | 103439075 A | 12/2013 | |
| CN | 204479258 U | 7/2015 | |
| CN | 105004502 A | 10/2015 | |
| CN | 204882023 U | 12/2015 | |
| DE | 19750157 A1 | 5/1998 | |
| DE | 10109375 A1 * | 9/2002 | ........ G01M 17/0078 |
| EP | 0660097 A2 | 6/1995 | |
| GB | 2548478 A | 9/2017 | |
| KR | 200000061161 A | 10/2000 | |
| KR | 20090052004 A | 5/2009 | |

OTHER PUBLICATIONS

Non-Final Office Action dated Apr. 24, 2018 in re U.S. Appl. No. 15/264,161, filed Sep. 13, 2016.

UKIPO Search Report for Application No. GB1714589.7 dated Jan. 31, 2018 (5 pages).

* cited by examiner

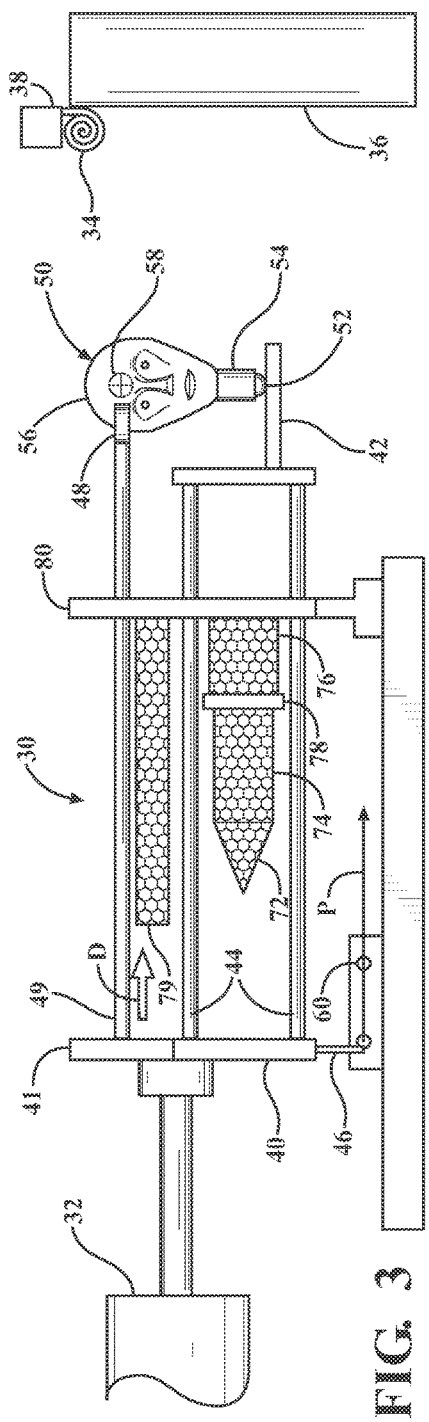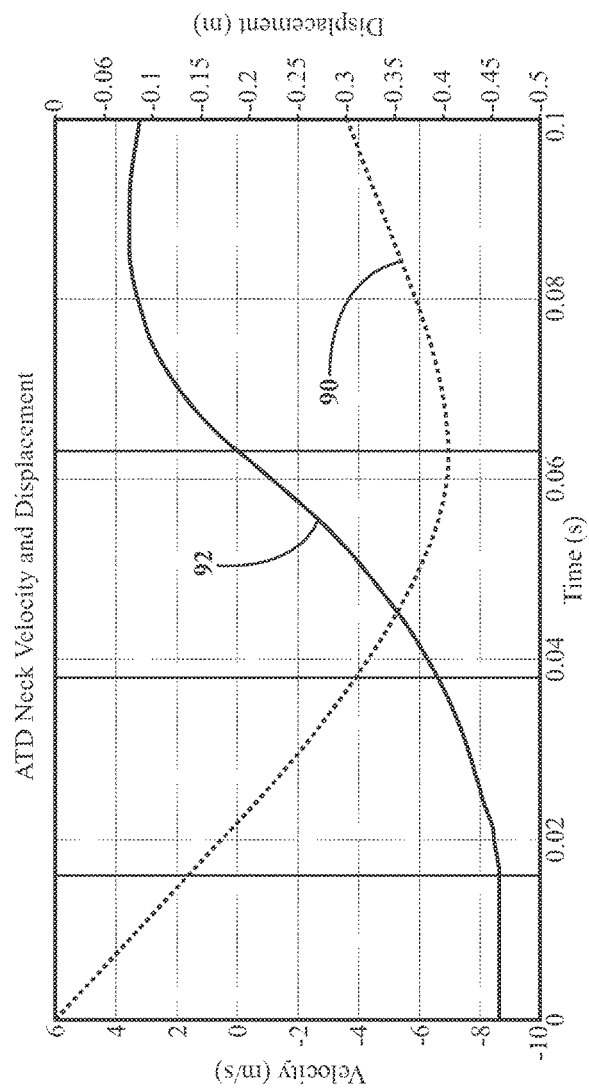
FIG. 3
FIG. 4

AIRBAG TESTING APPARATUS HAVING AN ANTHROPOMORPHIC TEST DEVICE

BACKGROUND

Vehicles may be subject to side impact testing standards. As one example, Federal Motor Vehicle Safety Standard (FMVSS) 214 provides a test procedure designed to simulate a vehicle experiencing a side collision with a pole. The test procedure of FMVSS 214 provides that a test vehicle holding a test dummy as an occupant collides sideways at 20 miles per hour into a rigid vertical pole 10 inches in diameter. FMVSS 214 sets forth requirements for head injury criterion (HIC), which is a function of the acceleration over time of the center of gravity of the head of the dummy. To take another example, Euro NCAP (New Car Assessment Program), a safety regulator for several European countries, promulgates a similar test design.

These side impact testing standards are performed on a full vehicle equipped with side airbags, such as side curtain airbags and torso airbags. However, during the full vehicle test, the vehicle is demolished and thus cannot be reused. Multiple tests may be run to optimize or refine the design of the vehicle, requiring a new vehicle to be demolished for each test run.

What is needed is an apparatus to more cost-effectively test side impacts under side impact testing standards.

BRIEF DESCRIPTION OF THE DRAWINGS

FIG. 3 is a side view of the test apparatus before running a test.
FIG. 4 is a graph of velocity and displacement during a test.

DETAILED DESCRIPTION

Figure 1:
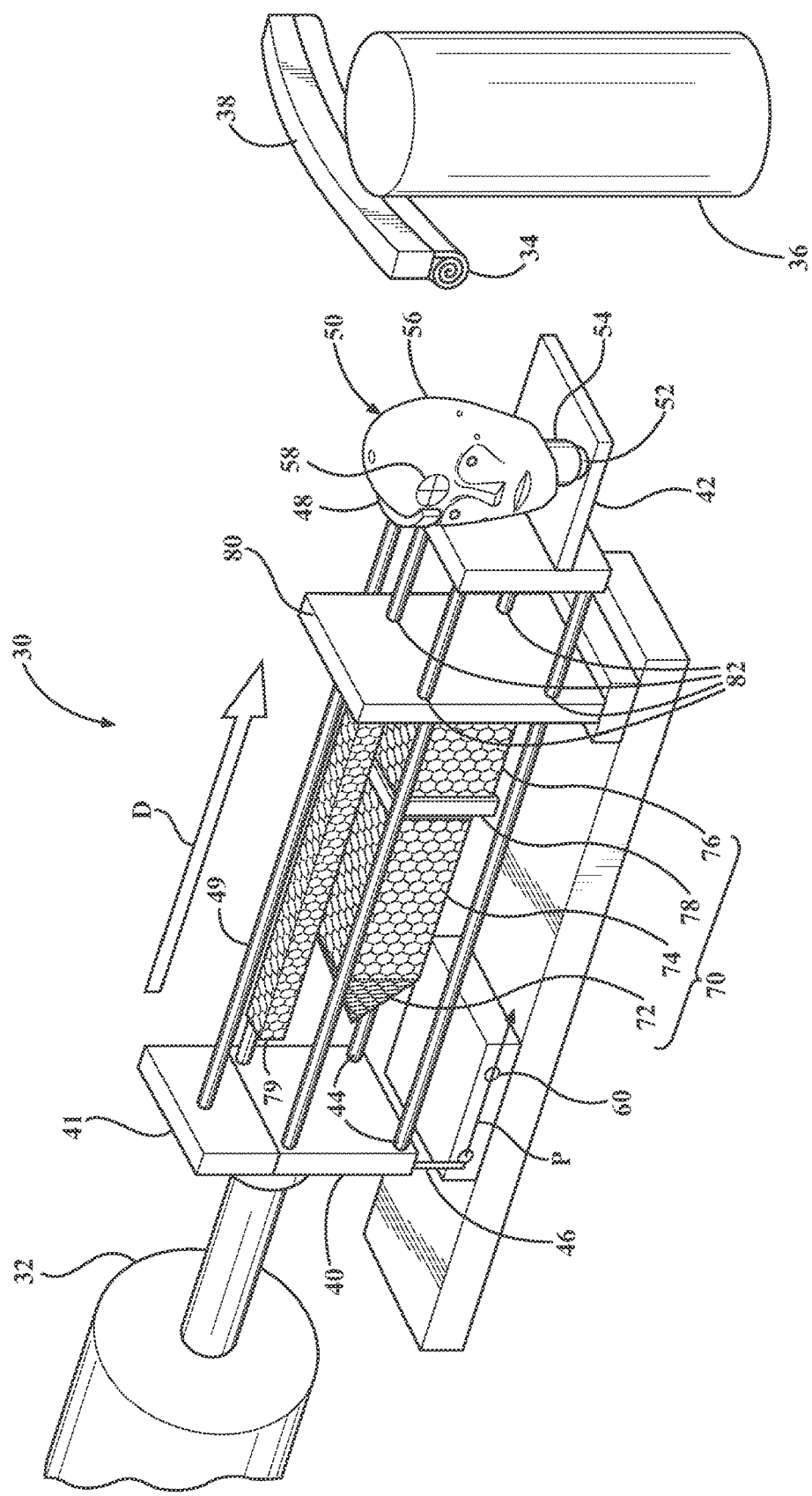
FIG. 1 is a perspective view of a test apparatus.

With reference to the Figures, wherein like numerals indicate like parts throughout the several views, a test apparatus 30 includes a linear motion generator 32, an airbag 34, a plate 40, a platform 42, an anthropomorphic test device 50, and a crushable member 70. The airbag 34 is spaced from the linear motion generator 32. The plate 40 is moveable by the linear motion generator 32 toward the airbag 34, and the platform 42 is fixed relative to the plate 40. The anthropomorphic test device 50 is adjacent the airbag 34 and includes an end 52 coupled to the platform 42. The crushable member 70 is disposed between the plate 40 and the platform 42, and the crushable member 70 is deformable by the plate 40.

The test apparatus 30 has a smaller footprint and less powerful equipment than running a full vehicle test according to, for example, FMVSS 214 or Euro NCAP. The test run on the test apparatus 30 does not entail the demolition of an entire vehicle. The test apparatus 30 is thus easier and more cost-effective to use, allowing testing of a greater number of iterations of an airbag design with less resources.

The linear motion generator 32 may be moveably connected to the plate 40, as well as to a stabilizing hook plate 41. The linear motion generator 32 may move the plate 40 and the stabilizing hook 41 along a straight-line path. The linear motion generator 32 may be a piston, a linear actuator, a compressed air cylinder, or any other suitable mechanism to move an object along a straight path. Specifically, the linear motion generator 32 may be a compressed air cylinder utilizing compressed nitrogen, such as is manufactured by Bendix.

Figure 2:
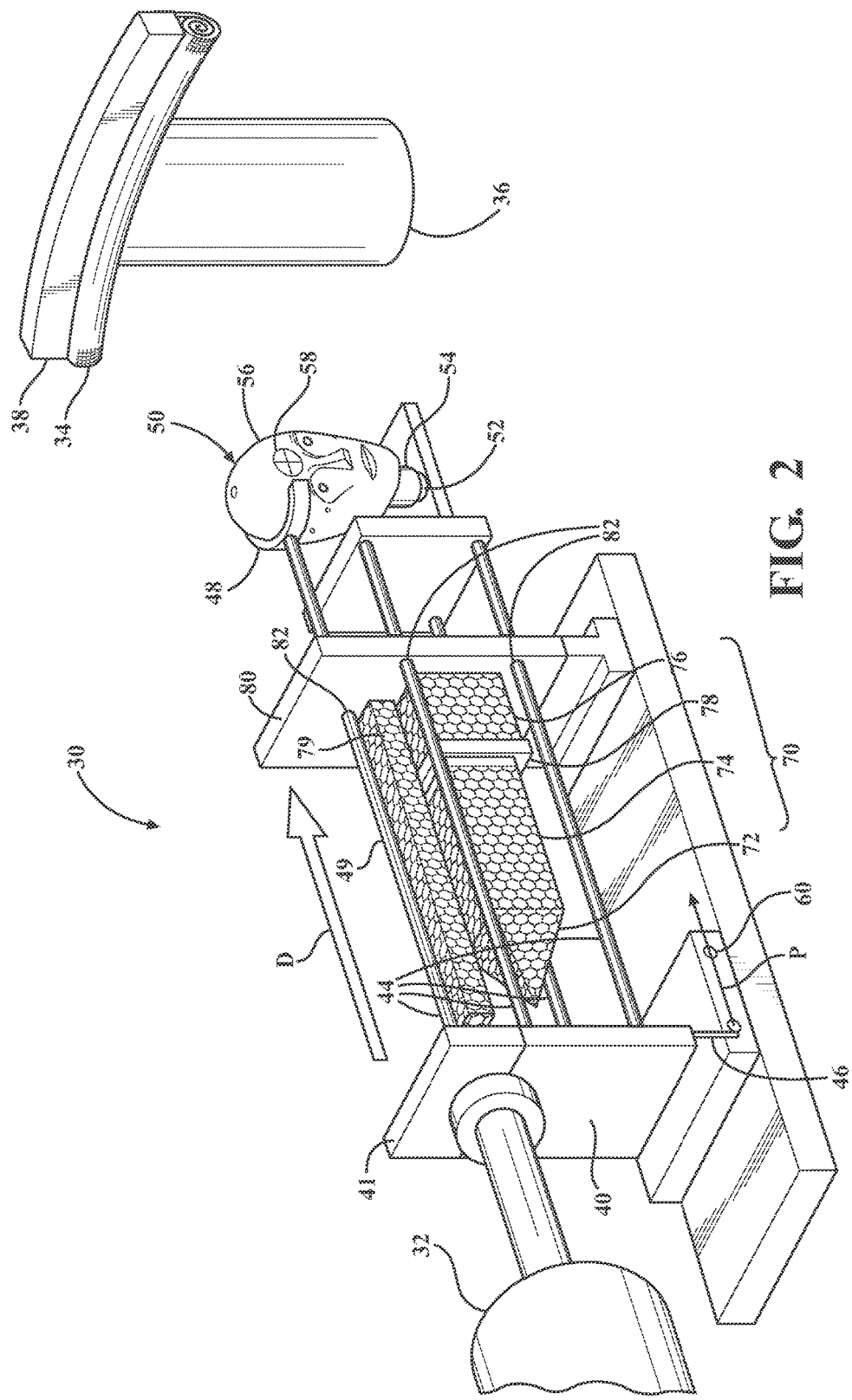
FIG. 2 is another perspective view of the test apparatus.

With reference to FIGS. 1 and 2, the airbag 34 may be spaced from the linear motion generator 32. The airbag 34 may be any type of airbag, such as a front airbag or a side curtain airbag. The airbag 34 may be attached to a frame member 38.

The frame member 38 may be the roof rail of a vehicle or may be a beam simulating a roof rail of a vehicle, for example, having the same size, shape, and/or material as a roof rail of a vehicle. The frame member 38 may be attached to the impactor 36.

With continued reference to FIGS. 1 and 2, the test apparatus 30 may include an impactor 36. The impactor 36 may support the airbag 34, for example, via the frame member 38. The impactor 36 may be a rigid object; more specifically, the impactor 36 may be a rigid vertical pole 10 inches in diameter as used in testing in accordance with FMVSS 214. Alternatively, the impactor 36 may be a moving deformable barrier, such as one conforming to the requirements of testing promulgated by the National Highway Traffic Safety Administration (NHTSA), the Economic Commission for Europe (ECE), or the Insurance Institute for Highway Safety (IIHS).

The plate 40 may be moveable by the linear motion generator 32 toward the airbag 34. The plate 40 may be aligned in a direction of movement D defined by the linear motion generator 32 with the crushable member 70. The plate 40 may have a flat surface (not numbered) facing toward the crushable member 70. The plate 40 may be rigid relative to the crushable member 70. The plate 40 may be formed of metal, or any other suitable material.

Figure 5:
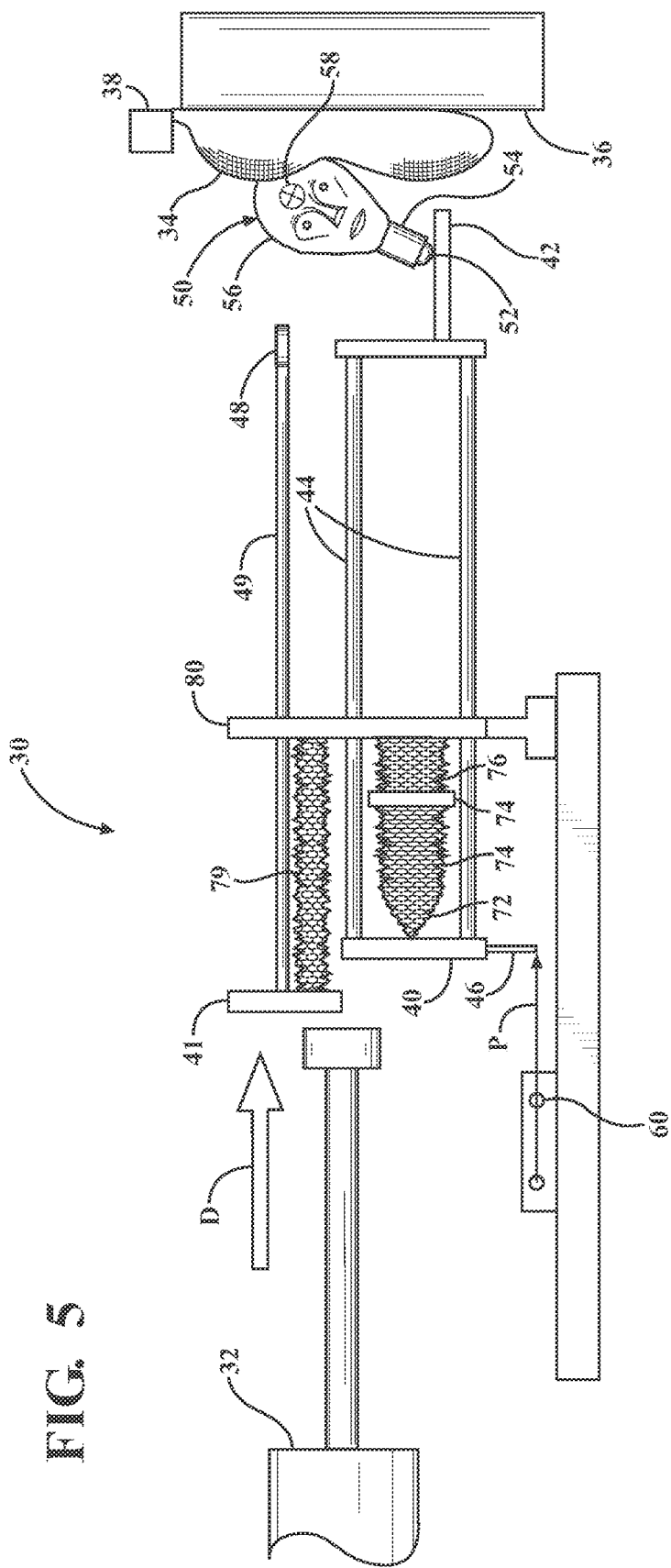
FIG. 5 is a side view of the test apparatus upon completion of a test.

The platform 42 may be fixed relative to the plate 40. The platform 42 may be moveable from an initial position, as shown in FIGS. 1-3, to a test position spaced from the airbag 34, as shown in FIG. 5. The platform 42 is moveable with the plate 40 in the direction of movement D defined by the linear motion generator 32. A path along the direction of movement D by the platform 42 from the initial position to the test position may not intersect the impactor 36 or the airbag 34.

With reference to FIGS. 1 and 2, the test apparatus 30 may include guiderails 44. The guiderails 44 may be fixed to the platform 42 and to the plate 40. The guiderails 44 may be cylindrical in shape and extend along the direction of movement D from the plate 40 to the platform 42. The guiderails 44 may fix the platform 42 relative to the plate 40.

With continued reference to FIGS. 1 and 2, a laser sensor 60 may be fixed relative to the linear motion generator 32 and may have a beam axis A. The laser sensor 60 may be in communication with the airbag 34. The laser sensor 60 may be a retroreflective laser, a spot reflective laser, or any suitable sensor that detects if an object crosses the beam axis A. The beam axis A may be transverse or perpendicular to the direction of movement D.

A sensor tripping member 46 may be fixed relative to the plate 40 and have a path of travel P. The path of travel P may pass across the beam axis A. The path of travel P may extend in the direction of movement D. The sensor tripping member 46 may be any suitable object to block a laser beam.

With continued reference to FIGS. 1 and 2, the anthropomorphic test device 50 may be adjacent to the airbag 34, that is, there is nothing between the anthropomorphic test device 50 and the airbag 34. The anthropomorphic test device 50 may be spaced from the airbag 34, for example, before a test is run.

The anthropomorphic test device 50 may serve as a human analogue to test the effects of vehicle impacts on humans. Examples of anthropomorphic test devices 50 include the Hybrid III dummy, the Side Impact Dummy (SID), the THOR dummy, EuroSID, WorldSID, partial versions thereof, or any other suitable human analogue.

The anthropomorphic test device 50 may include an end 52 coupled to the platform 42. The anthropomorphic test device 50 may include a dummy neck 54 mounted to the platform 42 and a dummy head 56 fixed to the dummy neck 54.

The dummy neck 54 may be rotatable relative to the platform 42. Specifically, the dummy neck 54 may be rotatable in the direction of movement D. Thus, when the platform 42 moves in the direction of movement D toward the airbag 34 and the impactor 36 and stops short, as shown in FIG. 5, the dummy neck 54 may rotate toward the airbag 34 and/or the impactor 36. The dummy neck 54 may be divided into an upper portion and a lower portion.

The dummy head 56 may be fixed to the dummy neck 54. When the platform 42 moves in the direction of movement D toward the airbag 34 and the impactor 36 and stops short, the dummy head 56 may rotate with the dummy neck 54 toward and possibly contact the airbag 34 and/or the impactor 36.

A stabilizing hook 48 may be adjacent to the dummy head 56. The stabilizing hook may have a semi-circular shape about the dummy head 56. The stabilizing hook 48 may be disposed opposite the direction of movement D relative to the dummy head 56. When the platform 42 accelerates in the direction of movement D, the stabilizing hook 48 may hold the dummy head 56 upright, and when the platform 42 decelerates in the direction of movement D, the stabilizing hook 48 may permit the dummy head 56 to rotate in the direction of movement D.

A stabilizing hook guiderail 49 may support the stabilizing hook 48. The stabilizing hook guiderail 49 may be fixed to the stabilizing hook 48 and to the stabilizing hook plate 41. The stabilizing hook guiderail 49 may be cylindrical in shape and extend along the direction of movement D from the stabilizing hook plate 41 to the stabilizing hook 48. The stabilizing hook guiderail 49 may fix the stabilizing hook 48 relative to the stabilizing hook plate 41.

The stabilizing hook plate 41 may be moveable by the linear motion generator 32 toward the airbag 34. The stabilizing hook plate 41 may be aligned in a direction of movement D defined by the linear motion generator 32 with the secondary crushable member 79. The stabilizing hook plate 41 may have a flat surface (not numbered) facing toward the secondary crushable member 79. The stabilizing hook plate 41 may be rigid relative to the secondary crushable member 79. The stabilizing hook plate 41 may be formed of metal, or any other suitable material.

A sensor 58 may be supported by the anthropomorphic test device 50. The sensor 58 may be, for example, an accelerometer, a load sensor, and/or a motion sensor. The sensor 58 may be disposed at the center of gravity of the dummy head 56, on the surface of the dummy head 56, or any other suitable location for gathering data. Alternatively, the anthropomorphic test device 50 may support a plurality of sensors 58. The sensors 58 may gather data during a test to determine the forces, moments, velocities, and positions of the anthropomorphic test device 50 during the test. For example, sensors 58 may be supported by both the upper and lower portions of the dummy neck 54. Sensors 58 may also be supported by the platform 42.

With reference to FIGS. 1 and 2, the test apparatus 30 may include a mount 80. The mount 80 may be disposed between the platform 42 and the crushable member 70. The mount 80 may support the crushable member 70 and the secondary crushable member 79 and may define a bore 82 receiving the guiderail 44. The bore 82 may slidably receive the guiderail 44, in other words, the bore 82 may permit the guiderail 44 to slide freely along the direction of movement D. The mount 80 may slidably receive the stabilizing hook guiderail 49. For example, the mount 80 may define a bore (not numbered) that slidably receives the stabilizing hook guiderail 49.

The crushable member 70 may be disposed between the plate 40 and the platform 42; specifically, the crushable member 70 may be disposed between the mount 80 and the plate 40. The crushable member 70 may be fixed to and supported by the mount 80. The crushable member 70 may be aligned in the direction of movement D from the plate 40.

The crushable member 70 may include a plurality of crushable segments 72, 74, 76 having different compressive yield strengths from each other. Thus, when experiencing a load in compression, each of the plurality of crushable segments 72, 74, 76 will fail or yield at a different value of force.

The plurality of crushable segments 72, 74, 76 may be arranged linearly between the plate 40 and the platform 42. The plurality of crushable segments 72, 74, 76 may have different cross-sectional dimensions and lengths from each other.

A panel 78 may be disposed between the plurality of crushable segments 72, 74, 76. For example, the panel 78 may be disposed between the crushable segment 74 and the crushable segment 76.

The crushable member 70 may have a honeycomb structure, that is, a cross-section of the crushable member 70 may have a pattern of polygon tiling, for example, hexagon tiling. A cross-section showing hexagon tiling may run perpendicular to the direction of movement D, or alternatively, a cross-section showing polygon tiling may run parallel or oblique to the direction of movement D. The plurality of crushable segments 72, 74, 76 may each have a honeycomb internal structure. The crushable member 70 may be formed of metal, such as aluminum, or of plastic or foam.

Alternatively, the crushable member 70 may be a programmable hydraulic or pneumatic piston. The crushable member 70 may be programmed to provide resistance that varies according to a time function or according to the position of the crushable member 70.

A secondary crushable member 79 may be disposed between the stabilizing hook plate 41 and the platform 42; specifically, the secondary crushable member 79 may be disposed between the mount 80 and the stabilizing hook plate 41. The secondary crushable member 79 may be fixed to and supported by the mount 80. The secondary crushable member 79 may be aligned in the direction of movement D from the stabilizing hook plate 41. The secondary crushable member 79 may have similar characteristics as the crushable member 70, or the characteristics of the secondary crushable member 79 may be different.

The crushable member 70 may stop movement of the plate 40 toward the airbag 34 when the platform 42 reaches the test position, for example, a position spaced from the impactor 36. The crushable member 70 is disposed along the direction of movement D from the plate 40, so when the plate 40 moves along the direction of movement D, the crushable member 70 may impede the movement of the plate 40, slowing the plate 40. The crushable member 70 may be deformable by the plate 40. Thus, the crushable member 70 may yield before the plate 40 yields.

The secondary crushable member 79 may stop movement of the stabilizing hook plate 41 toward the airbag 34 before the platform 42 reaches the test position, for example, a position spaced from the impactor 36. The secondary crushable member 79 is disposed along the direction of movement D from the stabilizing hook plate 41, so when the stabilizing hook plate 41 moves along the direction of movement D, the secondary crushable member 79 may impede the movement of the stabilizing hook plate 41, slowing the stabilizing hook plate 41. The secondary crushable member 79 may be longer than the crushable member 70, so the secondary crushable member 79 may impede the movement of the stabilizing hook plate 41 before the crushable member 70 impedes the movement of the plate 40. The secondary crushable member 79 may be deformable by the stabilizing hook plate 41. Thus, the secondary crushable member 79 may yield before the stabilizing hook plate 41 yields.

As set forth further below, the crushable segments 72, 74, 76 may be designed to simulate the forces on the anthropomorphic test device 50 from a vehicle side impact. For example, the crushable segments 72, 74, 76 may be designed to simulate yielding of components of a vehicle such as a door or frame members that, in the case or a stationary barrier, decelerate the torso of an occupant before the head of the occupant makes contact with an airbag or an impacting structure (or, in the case of a moving barrier, accelerate the torso). The plurality of crushable segments 72, 74, 76 may be designed to sequentially yield, for example, crushable segment 72 may first yield, followed by crushable member 74, followed by crushable member 76. Alternatively, crushable member 72, crushable member 74, and/or crushable member 76 may be designed to simultaneously yield.

In a test run, the test apparatus 30 may begin in the position depicted in FIG. 3. The linear motion generator 32 may be triggered, and the linear motion generator 32 may then accelerate the plate 40 and the stabilizing hook plate 41 in the direction of movement D. Because the plate 40 may be fixed relative to the platform 42 and the sensor tripping member 46, the platform 42 and the sensor tripping member 46 may accelerate in tandem with the plate 40. The stabilizing hook 48, accelerated by the linear motion generator 32 simultaneous with the platform 42, may hold the dummy head 56 of the anthropomorphic test device 50 upright. After a predetermined distance, the linear motion generator may cease accelerating plate 40 and stabilizing hook plate 41, and the platform 42 and the stabilizing hook 48 may continue traveling forward by momentum. The stabilizing hook 41 may then strike the secondary crushable member 79. The secondary crushable member 79 may yield and decelerate the stabilizing hook 41. The secondary crushable member 79 may provide sufficient resistance to stop the stabilizing hook plate 41 and the stabilizing hook 48. The dummy head 56 may remain upright without the stabilizing hook 48 because the dummy head 56 may be traveling at the same velocity as the platform 42. The sensor tripping member 46 may then cross the beam axis A of the laser sensor 60, tripping the laser sensor 60. The laser sensor 60 may communicate to the airbag 34 to deploy. The airbag 34 may deploy in front of the impactor 36. At the same time, the plate 40 may strike the crushable member 70. The crushable segments 72, 74, 76 of the crushable member 70, for example, may sequentially yield—first the crushable segment 72, then the crushable segment 74, finally the crushable segment 76. Because each crushable segment 72, 74, 76 has a different compressive yield strength, each crushable segment 72, 74, 76 imparts a different decelerating force to the plate 40. The crushable member 70 may provide sufficient resistance to stop the plate 40. With the platform 42 stopped by the stoppage of the plate 40, the momentum of the dummy head 56 may cause the dummy head 56 to rotate in the direction of movement D into the now-deployed airbag 34 and possibly the impactor 36, depending on the cushioning provided to the dummy head 56 by the airbag 34. FIG. 5 depicts the final position of a test run. Throughout the test run, the sensors 58 supported by the anthropomorphic test device 50 may have recorded data.

The effect of the test apparatus 30 is to simulate the forces on the anthropomorphic test device 50 from a vehicle side impact. In a vehicle side impact with an impacting structure, the yielding of components of a vehicle such as a door, a door trim, an airbag, or frame members decelerate the torso of an occupant before the head of the occupant makes contact with an airbag or the impacting structure. In a vehicle side impact with a moving impacting structure, the impacting structure, via the yielding components, accelerates the torso of the occupant before the head of the occupant makes contact with the airbag or the impacting structure. An appropriate choice of sizes, shapes, and number of crushable segments 72, 74, 76 in the crushable member 70 may mimic the deceleration experienced in a collision. FIG. 4 depicts a graph of the displacement and velocity of the anthropomorphic test device 50 versus time during a test run. Adjusting the dimensions of the crushable segments 72, 74, 76 will change the shapes of the displacement curve 90 and velocity curve 92 on the graph. If the displacement and velocity curves 90, 92 on the graph provide a close fit for the position and velocity profile during the test of a particular vehicle according to the protocol of a test of interest such as FMVSS 214, NCAP, ECE, IIHS, etc., then airbags 34 can be tested with this test apparatus 30 more quickly and cost-effectively.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A test apparatus comprising:
a linear motion generator;
an airbag spaced from the linear motion generator;
a plate moveable by the linear motion generator toward the airbag;
a platform fixed relative to the plate and moveable with the plate from an initial position to a test position spaced from the airbag;
an anthropomorphic test device adjacent the airbag and including an end coupled to the platform; and
a crushable member disposed between the plate and the platform during all positions of the platform from the initial position to the test position, the crushable member being deformable by the plate.

2. The test apparatus of claim 1, wherein the crushable member has a honeycomb structure.

3. The test apparatus of claim 2, wherein the crushable member is formed of metal.

4. The test apparatus of claim 1, wherein the crushable member includes a plurality of crushable segments having different compressive yield strengths from each other.

5. The test apparatus of claim 4, wherein the plurality of crushable segments are arranged linearly between the plate and the platform.

6. The test apparatus of claim 5, further comprising a panel disposed between the plurality of crushable segments.

7. The test apparatus of claim 4, wherein the plurality of crushable segments each has a honeycomb internal structure.

8. The test apparatus of claim 1, further comprising a guiderail fixed to the platform and to the plate, and further comprising a mount supporting the crushable member wherein a bore receives the guiderail through the mount.

9. The test apparatus of claim 8, wherein the mount is disposed between the platform and the crushable member, and wherein the crushable member is disposed between the mount and the plate.

10. The test apparatus of claim 1, wherein the platform is moveable from an initial position to a test position spaced from the airbag, the crushable member stopping movement of the plate toward the airbag when the platform reaches the test position.

11. The test apparatus of claim 1, wherein the anthropomorphic test device includes a dummy neck mounted to the platform, and a dummy head fixed to the dummy neck.

12. The test apparatus of claim 11, wherein the dummy neck is rotatable relative to the platform.

13. The test apparatus of claim 11, further comprising a stabilizing hook adjacent to the dummy head.

14. The test apparatus of claim 1, further comprising a sensor supported by the anthropomorphic test device.

15. The test apparatus of claim 14, wherein the sensor is an accelerometer.

16. The test apparatus of claim 14, wherein the sensor is a load sensor.

17. The test apparatus of claim 14, wherein the sensor is a motion sensor.

18. The test apparatus of claim 1, further comprising an impactor supporting the airbag.

19. The test apparatus of claim 1, further comprising:
a laser sensor fixed relative to the linear motion generator and having a beam axis; and
a sensor tripping member fixed relative to the plate and having a path of travel, the path of travel passing across the beam axis.

20. The test apparatus of claim 19, wherein the laser sensor is in communication with the airbag.

21. A test apparatus comprising:
a linear motion generator;
an airbag spaced from the linear motion generator;
a plate moveable by the linear motion generator toward the airbag;
a platform fixed relative to the plate;
an anthropomorphic test device adjacent the airbag and including an end coupled to the platform;
a crushable member disposed between the plate and the platform, the crushable member being deformable by the plate;
a guiderail fixed to the platform and to the plate; and
a mount supporting the crushable member, wherein a bore receives the guiderail through the mount.

22. The test apparatus of claim 21, wherein the mount is disposed between the platform and the crushable member, and wherein the crushable member is disposed between the mount and the plate.

23. A test apparatus comprising:
a linear motion generator;
an airbag spaced from the linear motion generator;
a plate moveable by the linear motion generator toward the airbag;
a platform fixed relative to the plate;
an anthropomorphic test device adjacent the airbag and including an end coupled to the platform;
a crushable member disposed between the plate and the platform, the crushable member being deformable by the plate;
a laser sensor fixed relative to the linear motion generator and having a beam axis; and
a sensor tripping member fixed relative to the plate and having a path of travel, the path of travel passing across the beam axis.

24. The test apparatus of claim 23, wherein the laser sensor is in communication with the airbag.

* * * * *